US010395261B2

(12) United States Patent
Drake et al.

(10) Patent No.: US 10,395,261 B2
(45) Date of Patent: Aug. 27, 2019

(54) IDENTIFYING AND SCORING KEY INFLUENCERS IN A NETWORK

(71) Applicant: T-Mobile USA, Inc., Bellevue, WA (US)

(72) Inventors: Aaron Drake, Sammamish, WA (US); Jonathan Morrow, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/421,102

(22) Filed: Jan. 31, 2017

(65) Prior Publication Data

US 2018/0218377 A1 Aug. 2, 2018

(51) Int. Cl.

| | |
|---|---|
| ***G06Q 30/02*** | (2012.01) |
| ***H04L 12/58*** | (2006.01) |
| ***H04M 15/00*** | (2006.01) |
| ***H04W 4/14*** | (2009.01) |
| ***H04M 3/22*** | (2006.01) |
| *H04L 29/08* | (2006.01) |
| *G06Q 50/00* | (2012.01) |
| *H04M 3/51* | (2006.01) |

(52) U.S. Cl.

CPC ......... *G06Q 30/0201* (2013.01); *H04L 51/32* (2013.01); *H04M 3/2218* (2013.01); *H04M 15/58* (2013.01); *H04M 15/8044* (2013.01); *H04W 4/14* (2013.01); *G06Q 50/01* (2013.01); *H04L 67/22* (2013.01); *H04M 3/5158* (2013.01)

(58) Field of Classification Search

CPC ............. H04M 2215/32; H04M 15/00; H04M 3/2218; H04M 15/58; H04W 4/24; H04W 4/14; G06Q 30/0201; G06Q 50/01; H04L 51/32; H04L 67/22

USPC .......................................................... 455/405

See application file for complete search history.

(56) References Cited

U.S. PATENT DOCUMENTS

| | | | | |
|---|---|---|---|---|
| 9,235,865 | B1 | 1/2016 | Zang et al. | |
| 2009/0063254 | A1 | 3/2009 | Paul et al. | |
| 2013/0185245 | A1 | 7/2013 | Anderson et al. | |
| 2013/0268595 | A1* | 10/2013 | Mohan | H04L 51/32 709/204 |
| 2014/0119522 | A1* | 5/2014 | Phadke | H04M 15/44 379/133 |
| 2015/0112893 | A1 | 4/2015 | Subramanian et al. | |
| 2016/0283884 | A1 | 9/2016 | Wilson et al. | |
| 2017/0017908 | A1* | 1/2017 | Bracher | G06Q 10/0635 |
| 2017/0277691 | A1* | 9/2017 | Agarwal | H04L 67/22 |

OTHER PUBLICATIONS

International Search Report and Written Opinion for PCT Application No. PCT/US2018/016294 dated May 8, 2018, 13 pages.

* cited by examiner

*Primary Examiner* — Joel Ajayi

(74) *Attorney, Agent, or Firm* — Han Santos, PLLC

(57) ABSTRACT

Some users of communications systems and social networks have more influence over other users due to having more contacts and communications with people through the systems and networks. The techniques described herein identify these more influential users. Data from such users is used to provide a scoring metric for each user, and user can be ranked according to the scoring metric. Communications can then be made to a subset of users based on the rankings.

15 Claims, 4 Drawing Sheets

200

CALL DATA RECORD

202 ROWS

| DATE | NUMBER | TYPE | START | DURATION | SIZE |
|---|---|---|---|---|---|
| 01-JAN-2016 | 1234567891 | V | 00:00:00:30 | 0:30 | |
| 01-JAN-2016 | 1234567892 | S | 00:00:00:40 | | 2 |
| 01-JAN-2016 | 1234567892 | S | 00:00:00:53 | | 8 |
| 01-JAN-2016 | 1234567892 | S | 00:00:01:15 | | 4 |
| 01-JAN-2016 | 1234567892 | S | 00:00:01:20 | | 1 |
| 02-JAN-2016 | 1234567891 | V | 00:08:01:34 | 1:30 | |
| 02-JAN-2016 | 1234567891 | V | 00:09:13:22 | 5:31 | |
| 02-JAN-2016 | 1234567893 | V | 00:10:02:02 | 10:21 | |
| 02-JAN-2016 | 1234567895 | V | 00:14:11:53 | 2:43 | |
| 03-JAN-2016 | 1234567891 | S | 00:15:43:33 | | 2 |
| 03-JAN-2016 | 1234567891 | S | 00:15:55:27 | | 8 |
| 03-JAN-2016 | 1234567893 | S | 00:15:58:16 | | 4 |
| 03-JAN-2016 | 1234567893 | V | 00:19:02:01 | 12:12 | |
| 03-JAN-2016 | 1234567892 | V | 00:19:22:34 | 1:44 | |
| 03-JAN-2016 | 1234567894 | V | 00:20:52:10 | 5:58 | |

. . .

206 208 210 212 214 216

204 COLUMNS

FIG. 2

PHONE CALLS

302

| Caller ID | # Calls | Average Duration | Total Duration |
|---|---|---|---|
| Contact #1 | 12 | 3 | 36 |
| Contact #2 | 12 | 30 | 360 |
| Contact #3 | 5 | 40 | 200 |
| Contact #4 | 20 | 5 | 100 |

MESSAGES

304

| Caller ID | # Texts | Average Data Size | Total Size |
|---|---|---|---|
| Contact #1 | 50 | 2 | 100 |
| Contact #2 | 100 | 4 | 400 |
| Contact #3 | 200 | 1 | 200 |
| Contact #4 | 400 | 8 | 3200 |

FIG. 3

IDENTIFYING AND SCORING KEY INFLUENCERS IN A NETWORK

BACKGROUND

For various reasons, many individuals and organizations often want to distribution information to as many people as possible. Whether that information is a message related to personal likes or dislikes of an individual, customer relationship management (CRM) issues, advertising, politics, charitable causes, etc., a source of such information typically wants his or her message to have as wide a distribution as possible. This is often the case with campaigns driven through e-mail, messaging, telephone calls, social networking sites, and the like. But such campaigns typically rely on indiscriminate blasts that rely on no other information than user contact information. Senders don't know whether the messaging that is sent to one user will be any more effective than the same messaging sent to a different user.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

FIG. 2 is a diagram of an example call data record, from which certain data is retrieved for use in the implementations described herein.

FIG. 3 is a representation of example data used in at least one described implementation.

DETAILED DESCRIPTION

Figure 1:
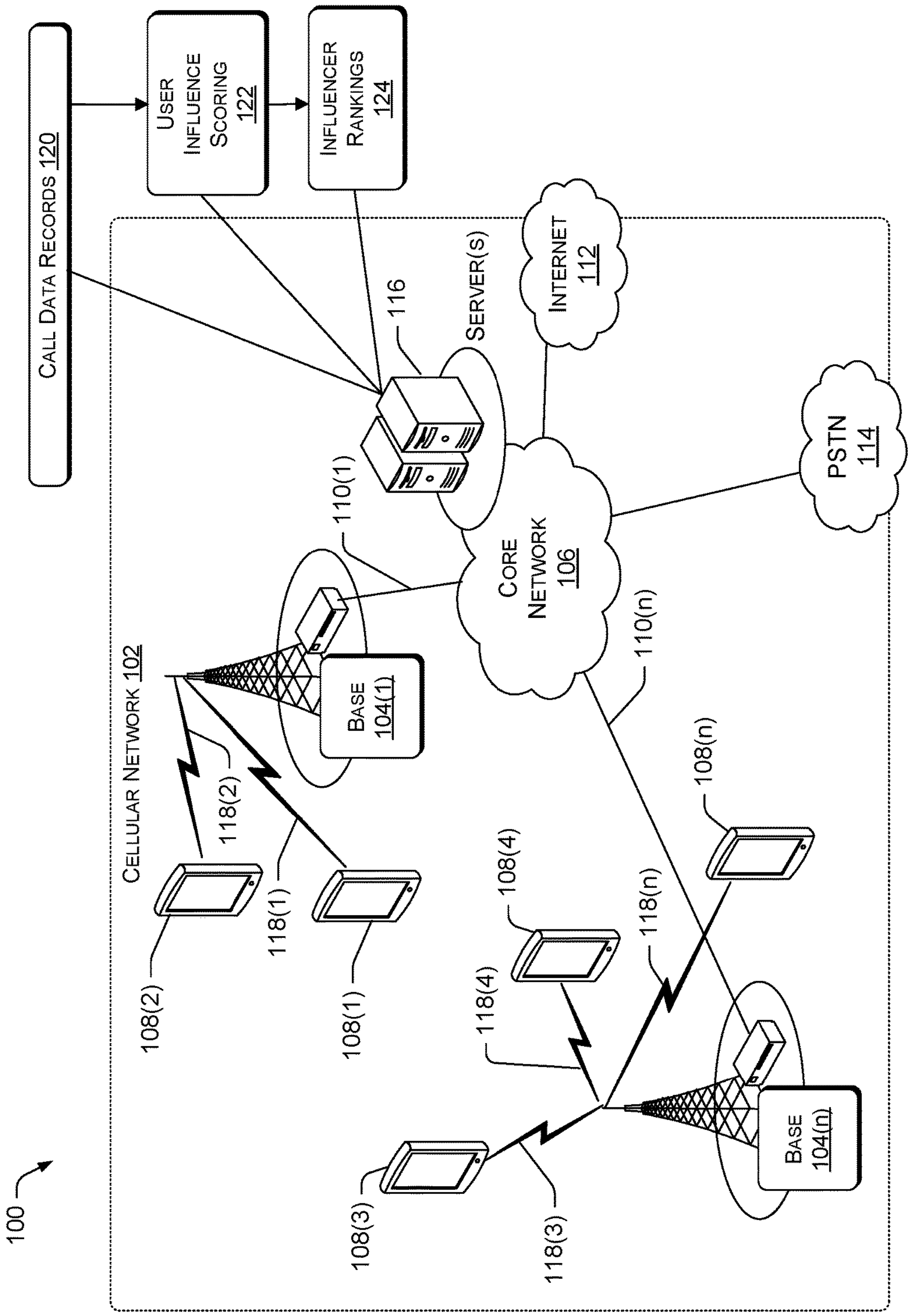
FIG. 1 illustrates an example cellular network architecture for implementing the technology described herein.

This disclosure is directed to techniques for identifying users in a network that are likely to have greater influence over acquaintances than do other network users. This disclosure is further directed to techniques for attaching a score, or rating, to users and for ranking the users according to a likelihood of having more influence with other people. In situations where expenditure of a resource is related to an amount of communications, resources are preserved through the use of the described techniques by limiting communications to users that are more likely to provide better results.

The identification and scoring aspects are based on a quantity of contacts made by each unique network user during a given time period. A quality of contact metric may also be used together with the quantity measurement to enhance the identification and scoring features. The quality of contact metric is based on an amount of information shared by the user during each contact with another person, for example, the length of a telephone call or the size of an electronic message.

In addition to the identification and scoring aspects of the presently described techniques, a ranking system is also disclosed. According to implementations of the ranking system, the relative influence value of each user can be measured against the other users.

By use of the techniques described herein, information sources desiring to get their message out to as many people as they can are able to prioritize messaging to those users deemed to be of greater influence with social connections, thereby exponentially increasing the message as it spreads (i.e. goes viral).

In contexts where information source entities must pay for access to contacts, the source entities can conserve resources by only paying for contacts that are likely to result in a greater perception of their message. Similarly, an entity charging for information regarding contacts is able to identify higher-value contacts and, thus, price each contact according to their ranking as a social influencer. In such circumstances, once an entity has derived a scoring/ranking for high influence users, the entity transmits the scoring/ranking data to the source entities.

Features of the techniques disclosed herein are described in greater detail below, with reference to the figures and their components and reference numerals.

Example Network Architecture

FIG. 1 illustrates an example cellular network architecture 100 for implementing the technology described herein, namely, systems and methods for identifying and scoring key influencers in a network. The network architecture 100 includes a carrier network 102 that is provided by a wireless telecommunication carrier. The carrier network 102 includes cellular network base stations 104(1)-104(n) and a core network 106. Although only two base stations are shown in this example, the carrier network 102 may comprise any number of base stations. The carrier network 102 provides telecommunication and data communication in accordance with one or more technical standards, such as Enhanced Data Rates for GSM Evolution (EDGE), Wideband Code Division Multiple Access (W-CDMA), HSPA, LTE, LTE-Advanced, CDMA-2000 (Code Division Multiple Access 2000), and/or so forth.

The base stations 104(1)-104(n) are responsible handling voice and data traffic between user devices, such as user devices 108(1)-108(n), and the core network 106. Each of the base stations 104(1)-104(n) may be communicatively connected to the core network 106 via a corresponding backhaul 110(1)-110(n). Each of the backhauls 110(1)-110(n) are implemented using copper cables, fiber optic cables, microwave radio transceivers, and/or the like.

The core network 106 also provides telecommunication and data communication services to the user devices 108(1)-108(n). In the present example, the core network connects the user devices 108(1)-108(n) to other telecommunication and data communication networks, such as the Internet 112 and public switched telephone network (PSTN) 114. The core network 106 include one or more servers 116 that implement network components. For example, the network components may include a serving GPRS support node (SGSN) that routes voice calls to and from the PSTN 112, a Gateway GPRS Support Node (GGSN) that handles the routing of data communication between external packet switched networks and the core network 106. The network components may further include a Packet Data Network (PDN) gateway (PGW) that routes data traffic between the GGSN and the Internet 112.

Each of the user devices 108(1)-108(n) is an electronic communication device, including but not limited to, a smartphone, a tablet computer, an embedded computer system, etc. Any electronic device that is capable of using the wireless communication services that are provided by the carrier network 102 may be communicatively linked to the carrier network 102. For example, a user may use a user device 108 to make voice calls, send and receive text messages, and download content from the Internet 110. A user device 108 is communicatively connected to the core network 106 via a base station 104. Accordingly, communication traffic between user device 108(1)-108(n) and the core network 106 are handled by wireless interfaces 118(1)-118(n) that connect the user devices 108(1)-108(n) to the base stations 104(1)-104(n).

The carrier network 102 is capable of monitoring characteristics of communications that pass through the carrier network 102 from a user device 108, the Internet 112, the PSTN 114, or from any other source. Descriptions of such characteristics are stored in the servers 116, and is commonly referred to as metadata. In the present example, such metadata are stored in a database of call data records 120. The call data records 120 store information related to communications from all network users, and can include, without limitation, an identification (i.e. phone number) of an originating party, an identification of a receiving party, starting time of a call or message, duration of call or data size of message, communication type (i.e. voice, Short Messaging System, etc.), and/or the like. An example call data record and its contents are described in greater detail, below.

At least some of the metadata from the call data records 120 are used in a user influencer scoring process 122 that determines influencer scores for some or all of the users in the cellular network 102. Influencer scores that result from this process are used in an influencer ranking process to identify key influencers in a network. These and other technicalities will be discussed in greater detail, below, with respect to subsequent figures.

Example Call Data Record

FIG. 2 is a diagram of an example call data record (CDR) 200, from which certain data is retrieved for use in the implementations described herein. A CDR can store any identifiable metadata associated with user in a cellular network. However, for present purposes, only a limited number of fields are shown and described with respect to the CDR 200 shown in FIG. 2.

The example CDR 200 includes multiple rows 202 and multiple columns 204. Each row 204 is associated with a communication to or from a user associated with the CDR 200. For each communication to or from the user, certain metadata is captured and stored in the CDR 200. Each of the columns 204 are associated with a certain type of metadata.

Column 206 identifies a date on which a communication is made, and Column 208 contains an identifier (typically a telephone number) is associated with an entity with which the communication is made. Column 210 identifies a type of the communication, either a voice call ("V") or a Short Messaging Service (SMS) message ("S") in this example. Other designations and other types of communications may be utilized in other examples.

Column 212 identifies a time at which the communication started. If the communication is related to a voice call, a duration of the voice call is denoted in column 214. If the communication is related to an SMS message, a size of the SMS is indicated in column 216.

Other metadata may be included in a call data record used for the purposes presented herein. The following discussion relates to metadata fields shown and described with respect to FIG. 2.

Example Data

FIG. 3 is a representation of example data 300 used in at least one implementation described herein. For description purposes, the example data is organized into table form. All data shown in FIG. 3 is calculated from information retrieved from a call data record associated with a user, similar to the CDR 200 shown in FIG. 2. The example data 300 will be referred to in subsequent discussion of the presently described techniques when an example process is discussed with reference to FIG. 4.

For convenience, the example data 300 is separated into phone call data (Table 302) and messaging data (Table 304). It is noted that the techniques described herein may be applied solely to phone call data or to messaging data, and in other implementations, other types of communication may be used.

The phone call data in Table 302 includes a column that identifies all unique identifiers (e.g. telephone numbers) which have communicated by phone with the user (i.e. the user's device) over a certain period of time. The period of time is immaterial to the techniques described herein and any period of time may be used. Typically, phone call and messaging data is aggregated over one month's time.

For each unique identifier, a total number of phone calls to or from the user is denoted. In this example, the user had twelve (12) telephone calls with Contact #1, twelve (12) calls with Contact #2, five (5) calls with Contact #3, and twenty (20) calls with Contact #4.

For each user, an average phone call duration is calculated from individual CDRs. In this example, the average phone call durations are: three (3) minutes for Contact #1, thirty (30) minutes for Contact #2, forty (40) minutes for Contact #3, and twenty (20) minutes for Contact #4.

The messaging data shown in Table 304 includes a column that identifies all unique identifiers (e.g. telephone numbers) which have communicated with the user (i.e. the user's device) over a certain period of time.

For each user, a total duration is calculated as the product of the total number of phone calls and the average phone call duration. The total phone call duration results are: thirty-six (36) minutes for Contact #1, three hundred sixty (360) minutes for Contact #2, two hundred (200) minutes for Contact #3, and one hundred (100) minutes for Contact #4.

The messages data shown in Table 304 includes a column that identifies all unique identifiers (e.g. telephone numbers) which have messaged with the user over a certain period of time. For each unique identifier, a number of texts, an average data size, and a total size are identified from a CDR and are shown in the table.

In the present example, the data associated with Contact #1 is fifty (50) text messages having an average data size of two (2) kilobytes (Kb) for a total size of one hundred (100) Kb. The data associated with Contact #2 is one hundred (100) text messages having an average data size of four (4) Kb for a total size of four hundred (400) Kb. The data associated with Contact #3 is two hundred (200) text messages having an average data size of one (1) Kb for a total size of two hundred (200) Kb. The data associated with Contact #4 is four hundred (400) text messages having an average data size of eight (8) Kb for a total size of three thousand two hundred (3,200) Kb.

The data shown in Table 302 and Table 304 will be used in the following discussion of FIG. 4 to further explain at least one implementation of a technique that can be used to identify key influencers in a network and score network users according to how influential they are likely to be.

Example Methodological Implementation

Figure 4:
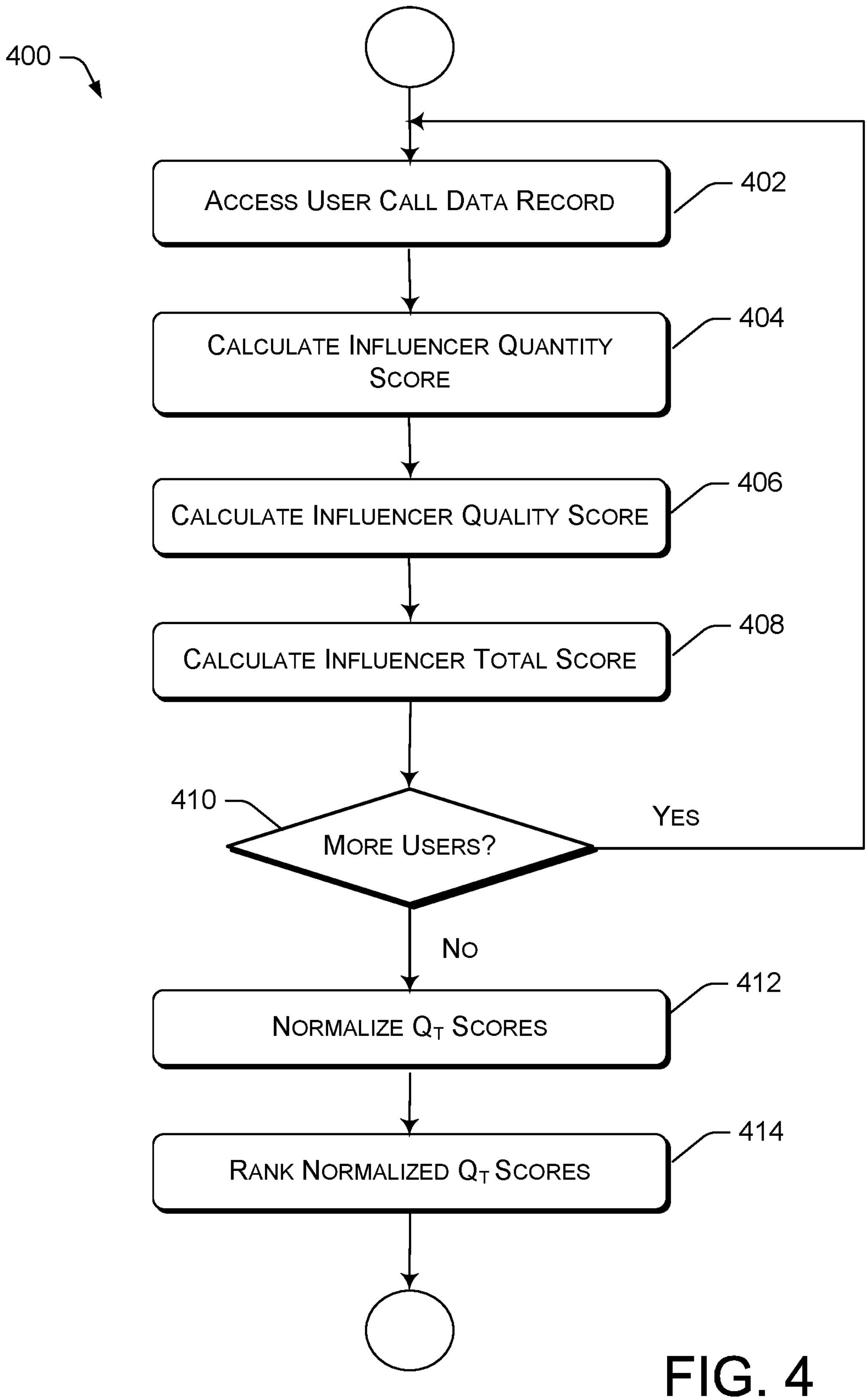
FIG. 4 is a flow diagram of an example methodological implementation for identifying and scoring key influencers in a network.

FIG. 4 is a flow diagram 400 of an example methodological implementation for identifying and scoring key influencers in a network. The flow diagram 400 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. In the following discussion, reference will be made to the data shown in Table 302 and Table 304 of FIG. 3.

At block 402, a call data record (CDR) of a network user is accessed to identify relevant metadata. At block 404, an influencer quantity score ($Q_N$) is calculated for each type of communication (note that only one type of communication, e.g. telephone calls, may be used). For each type of communication, the influencer quantity score ($Q_N$) is the number of communications per unique identifier. For convenience, results are rounded to the nearest whole integer. If more than two types of communication are used, then the influencer quantity score ($Q_N$), then the scores are averaged. Equations representing this determination are:

$$\text{Phone}(Q_N)=(\text{\# calls/unique identifiers})$$

$$\text{Messaging}(Q_N)=(\text{\# texts/unique identifiers})$$

$$Q_N=(\text{Phone}(Q_N)+\text{Messaging}(Q_N))/2$$

Using the data shown in Table 302 and Table 304, the quantity influencer score $Q_N$ for phone calls and messaging is determined as:

$$\text{Phone}(Q_N)=(49/4)=12$$

$$\text{Messaging}(Q_N)=(750/4)=187$$

$$Q_N=((12+187)/2)=99$$

Note that if reference is only to phone calls is used in the determination, the influencer quality score ($Q_N$) is 12. If reference is only to messaging, $Q_N$ is 187. Using both, $Q_N$ is equal to 99.

It is noted that a weight can be given to each type of communication depending on assumptions made about influencer value. For example, taking a simple average of influencer quantity scores ($Q_N$) for phone calls and messages assumes that one (1) phone call is equivalent to one (1) text message. Since another assumption could be that a person is about as likely to have more influence with one phone call as with ten (10) text messages, the calculations would change to take this into account. If such an assumption is made, the influencer quantity score would be determined thusly:

$$\text{Phone}(Q_N)=(49/4)=12$$

$$\text{Messaging}(Q_N)=((750/4)/10)=18$$

$$Q_N=((12+18)/2)=15$$

Any such alterations can be made to specific calculations determining on assumptions made. However, alterations to the specific calculations do not affect the scope of the basic concept outlined herein.

To derive a more accurate determination of influencer ranking, an influencer quality score ($Q_L$) is determined in addition to the influencer quantity score ($Q_N$). Use of an influencer quality score ($Q_L$) recognizes that not all communications are equal. For example, an assumption can be made that one (1) phone call having a duration of fifteen (15) minutes is likely to carry more influence than one (1) phone call of two (2) minutes, or ten (10) phone calls of one (1) minute each. The influencer quality score allows implementers to supplement their assumptions made about a level of influence that certain users, using certain types of communication methods, may have over other users.

At block 404, an influencer quality score ($Q_L$) is derived. If more than one type of communication is used, then an influencer quality score ($Q_L$) is calculated for each type of communication, and the results are averaged (or applied in some other way) to derive a final influence quality score ($Q_L$).

In the presently described implementation, a basic $Q_L$ is derived as an average (over all unique identifiers) of the products of the number of communications and the average duration/size of the communications for each unique identifier. The calculations are given by:

$$\text{Phone } Q_L=[\Sigma(\text{\# calls*avg duration of calls})]/\text{\# unique identifiers}$$

$$\text{Messaging } Q_L=[\Sigma(\text{\# messages*avg size of msgs})]/\text{\# unique identifiers}$$

$$Q_L=(\text{Phone } Q_L+\text{Messaging } Q_L)/2$$

As previously stated, a weighting may be given to one or more of the types of communications, depending on specific assumptions.

Using the data from FIG. 3, the $Q_L$ is determined as follows:

$$\text{Phone } Q_L=[(12*3)+(12*30)+(5*40)+(20*5)]/4=174$$

$$\text{Messaging } Q_L=[(50*2)+(100*4)+(200*1)+(400*8)]/4=975$$

$$Q_L=((174*975)/2))=574$$

It is noted that variations to these calculations can be made based on assumptions that are made about certain characteristics of communications. For example, if an assumption is made that phone calls of a very long length probably don't result in any greater influence than phone calls of a shorter, but substantial, length, a limiting factor may be implemented. Such a factor would apply a maximum value to call duration (or messaging length) to prevent outliers from adversely affecting a final result.

For example, if a user has one or more phone calls of three (3) or four (4) hours, it may be assumed that such calls carry no more influence with the receiver of the call than a phone call of, say, thirty (30) minutes. In such a case, phone call duration metadata can be limited to a maximum of thirty (30) minutes.

Similarly, it may be desirable to eliminate some phone calls of very short length. For instance, if a user makes ten (10) calls and reaches a voice mail greeting messages for nine (9) of those phone calls, it may be desirable to eliminate calls of less than 30 seconds from the calculations.

These and other variations can be made to account for certain situations in order to provide a more accurate estimate of a user's influence over other users based on call data record metadata.

After an influencer quantity score ($Q_N$) and an influencer quality score ($Q_L$) are known, they are used to derive a total influencer score $Q_T$ at block 408. Although it can vary, a basic calculation of the total influencer score $Q_T$ is averaging $Q_N$ and $Q_L$:

$$Q_T=(Q_N+Q_L)/2$$

Using the data from FIG. 3 and the results from previous calculations, the total influencer score in the example shown in FIG. 3 is:

$$Q_T=((99+574)/2)=386$$

At block 410, a determination is made if there are more users for whom to calculate influencer scores. It is noted that, although it is typically desirable to assign influencer scores (and, subsequently, rankings) to all users in a network, in some instances it may be desirable to use only a subset of all network users for whom to make such determinations.

If there are more network users for whom to calculate influencer scores ("Yes" branch, block 410), the process reverts to block 402 and is repeated for all users. Once all users have influencer scores derived for and assigned to them ("No" branch, block 410), the process continues at block 412.

It is noted that no further action is required to make a determination regarding which users are more influential than other users. However, it is convenient for users of the data that results from the previously described calculations. To this end, the total influencer quality ($Q_T$) scores are normalized to a defined scale at block 412. Normalizing the scores to a familiar and easy-to-understand scale, such as from 1 to 10, or from 1 to 100, makes it easier for people who view the data to understand how one user ranks against another.

At block 414, the normalized scores are ranked by sorting them in order. Although this step is optional, it allows for easier comprehension of the data and what the data signifies.

When a set of users has been scored and ranked, the information can be used to identify a subset of the most influential users in a network, and a message can be transmitted to only those deemed of value in this regard. Although this step is not fundamental to the techniques disclosed herein, it can be accomplished by an entity that calculates the influencer rankings or by another entity who has a reason to want to limit communications to key influencers in a system.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:

determining an influencer quantity score for each user in a subset of telephone network users of a telephone network, the influencer quantity score being based on at least a number of telephone communications by each user in the subset of telephone network user via the telephone network with unique identifiers during a period of time;

determining an influencer quality score for each user in the subset of telephone network users, the influencer quality score being based on at least individual instances of the telephone communications by each user in the subset of telephone network user with the unique identifiers, each individual instance having a magnitude that meets or exceeds a pre-determined minimum threshold;

determining a total influencer score for each user in the subset of telephone network user, the total influencer score for each user being based on the influencer quantity score and the influencer quality score for such user;

prioritizing messaging via a social network to one or more user in the subset of telephone network user on a basis of the one or more users in the subset of telephone network user having higher respective total influencer scores relative to respective total influencer scores of all user in the subset of telephone network user;

transmitting a message via the social network to the one or more users in the subset of telephone network users in accordance with the prioritizing;

prioritizing messaging via the telephone network to one or more users in the subset of telephone network users on a basis of the one or more users having higher respective total influencer scores relative to respective total influencer scores of all users in the subset of telephone network users;

charging a price for information regarding the one or more users in the subset of telephone network users according to the prioritizing; and transmitting a message via the telephone network to the one or more users in the subset of telephone network users in accordance with payment of the price.

2. The method as recited in claim 1, further comprising normalizing the total influencer scores across the subset of telephone network users to derive an influencer ranking for all of the subset of telephone network users.

3. The method as recited in claim 1, wherein the determining an influencer quantity score is further based on an average number of telephone communications per unique identifier.

4. The method as recited in claim 1, wherein:

the telephone communications are telephone calls, and the unique identifiers further comprise unique telephone numbers.

5. The method as recited in claim 1, wherein:

the telephone communications are electronic messages; and the unique identifiers further comprise unique electronic message sources.

6. The method as recited in claim 1, wherein:

the telephone communications are Short Messaging Service (SMS) messages; and the unique identifiers further comprise unique SMS messaging sources.

7. A method, comprising:

determining an influencer quantity score for each user in a subset of telephone network users of a telephone network, the influencer quantity score being based on at least a number of telephone communications by each user in the subset of telephone network users via the telephone network with unique identifiers during a period of time;

determining an influencer quality score for each user in the subset of telephone network users, the influencer quality score being based on at least individual instances of the telephone communications by each user in the subset of telephone network users with the unique identifiers, each individual instance having a magnitude that meets or exceeds a minimum threshold but does not exceed a maximum threshold;

determining a total influencer score for each user in the subset of telephone network users based on the influencer quantity score and the influencer quality score for such user;

prioritizing messaging via a social network to one or more users of the subset of telephone network users on a basis of the one or more users in the subset of telephone network users having higher respective total influencer scores relative to respective total influencer scores of all users in the subset of telephone network users;

transmitting a message via the social network to the one or more users of the subset of telephone network users in accordance with the prioritizing;

prioritizing messaging via the telephone network to one or more users of the subset of telephone network users on a basis of the one or more users having higher respective total influencer scores relative to respective total influencer scores of all users of the subset of telephone network users;

charging a price for information regarding the one or more users in the subset of telephone network users according to the prioritizing; and transmitting a message via the telephone network to the one or more users in accordance with payment of the price.

8. The method as recited in claim 7, further comprising normalizing the total influencer scores across the subset of telephone network users to derive an influencer ranking for all of the subset of telephone network users.

9. The method as recited in claim 7, wherein the influencer quality score is further based on a number of telephone communications and a magnitude of each telephone communication.

10. The method as recited in claim 7, wherein:

the network further comprises a cellular telephone network;

the telephone communications are telephone calls;

the influencer quality score is based at least in part on a duration of telephone calls with the unique identifiers; and the minimum threshold and the maximum threshold further comprise a length of telephone calls.

11. The method as recited in claim 7, wherein:

the network further comprises a cellular telephone network;

the telephone communications are text messages;

the influencer quality score is based at least in part on a size associated with SMS messages with the unique identifiers; and the minimum threshold and the maximum threshold further comprise a size of a text message.

12. One or more non-transitory computer-readable storage media storing computer-executable instructions, comprising:

a set of instructions configured to track telephone communications to and from a plurality of telephone communications system users of a telephone communications system;

a set of instructions configured to determine an influencer quantity score for each user in the plurality of telephone communications system users via the telephone communications system, the influencer quantity score based at least in part on a number of telephone communications by each user in the plurality of telephone communications system users with unique identifiers during a defined time period;

a set of instructions configured to determine an influencer quality score for each user in the plurality of telephone communications system users, the influencer quality score being based on a magnitude of individual instances of messages by each user in the plurality of telecommunications system users with the unique identifiers, the magnitude of each individual instance falling between a minimum threshold and a maximum threshold;

a set of instructions configured to determine a total influencer score for each user in the plurality of communications system users, the total influencer score for each user being at least partly based on the influencer quantity score and the influencer quality score for such user;

a set of instructions configured to prioritize messaging via a social network to one or more users in a subset of the telephone communications system users, the subset of the telephone communications system users being limited to the subset of users that have a sufficiently high total influencer score relative to respective total influencer scores of all users in the subset of telephone communications system users;

a set of instructions configured to transmit communications via the social network to the subset of telephone communications system users in accordance with the prioritizing;

a set of instructions configured to prioritize messaging via the telephone communications system to one or more users in the subset of telephone communications system users on a basis of the one or more users having higher respective total influencer scores relative to respective total influencer scores of all users in the subset of telephone communications system users;

a set of instructions configured to charge a price for information regarding the one or more users in the subset of telephone communications system users according to the prioritizing; and a set of instructions configured to transmit a message via the telephone communication system to the one or more users in the subset of telephone communications system users in accordance with payment of the price.

13. The one or more non-transitory computer-readable storage media as recited in claim 12, further comprising a set of instructions configured to normalize total influencer scores over a defined scoring range to derive an influencer ranking for each scored user.

14. The one or more non-transitory computer-readable storage media as recited in claim 12, wherein:

the telephone communications system further comprises a cellular telephone system; and the magnitude of messages are a duration of phone calls.

15. The one or more non-transitory computer-readable storage media as recited in claim 12, wherein:

the telephone communications system further comprises a cellular telephone network; and the magnitude of messages are a size of text messages.

* * * * *